(12) United States Patent
Chaiquin

(10) Patent No.: US 7,705,487 B2
(45) Date of Patent: Apr. 27, 2010

(54) POWER RESTORATION SYSTEM FOR ELECTRICAL POWER NETWORK

(75) Inventor: Eduardo Chaiquin, Ottawa (CA)

(73) Assignee: Virelec Ltd., Mississauga, Ontario (CA)

( * ) Notice: Subject to any disclaimer, the term of this patent is extended or adjusted under 35 U.S.C. 154(b) by 107 days.

(21) Appl. No.: 11/798,999

(22) Filed: May 18, 2007

(65) Prior Publication Data
US 2007/0271005 A1    Nov. 22, 2007

Related U.S. Application Data

(60) Provisional application No. 60/801,053, filed on May 18, 2006.

(51) Int. Cl.
  H02J 9/06    (2006.01)
  H04M 7/14    (2006.01)
(52) U.S. Cl. .................................. 307/64; 379/221.15
(58) Field of Classification Search ............. 307/64–66, 307/70, 71; 379/221.15, 901
See application file for complete search history.

(56) References Cited

U.S. PATENT DOCUMENTS

| | | | |
|---|---|---|---|
| 5,274,643 A * | 12/1993 | Fisk | ............. 370/238 |
| 6,047,331 A | 4/2000 | Medard et al. | |
| 6,275,366 B1 | 8/2001 | Gelbien et al. | |
| 6,341,054 B1 | 1/2002 | Walder et al. | |
| 6,697,240 B2 | 2/2004 | Nelson et al. | |
| 6,718,271 B1 | 4/2004 | Tobin | |
| 6,737,762 B2 * | 5/2004 | Koenig | .............. 307/48 |
| 6,907,321 B2 | 6/2005 | Kearney et al. | |
| 6,914,763 B2 | 7/2005 | Reedy | |
| 6,960,843 B2 * | 11/2005 | Yamamoto | .............. 307/86 |
| 7,406,084 B2 * | 7/2008 | Underwood | ........... 370/395.1 |
| 7,535,129 B2 * | 5/2009 | Phelps et al. | ............. 307/115 |

* cited by examiner

Primary Examiner—Albert W Paladini
(74) Attorney, Agent, or Firm—Freedman & Associates

(57) ABSTRACT

A robust power restoration method is described. The method involves establishing a set of virtual paths within a mesh network having at least two sources of electrical power. Each of the virtual paths is used to determine a suitable location for a non-conducting electrical bridge. When a fault is detected within the network, the state of the electrical bridges is modified to restore power.

21 Claims, 12 Drawing Sheets

POWER RESTORATION SYSTEM FOR ELECTRICAL POWER NETWORK

This application claims benefit from U.S. Provisional Patent Application No. 60/801,053 filed May 18, 2006, the entire contents of which is incorporated herein by reference.

BACKGROUND

A wide variety of services depend upon the reliable delivery of electrical energy in order to operate efficiently. Computers, traffic lights and a wide variety of appliances all rely upon external electrical energy provided by electrical power networks. Consequently, when the network in unable to provide electrical power a variety of infrastructure problems result.

A wide variety of problems lead to a failure to deliver electrical power in a network. In order to provide a flexible solution that supports the bypassing of non-functional power lines it is beneficial to employ an electrical power network with substantial redundancy. Unfortunately, this redundancy often leads to extremely complex network topologies. The complexity of these topologies in turn leads to difficulty in identifying failed components within electrical power network as well as difficulties in returning power to customers that experience power failures.

It would be beneficial to provide a simple solution that provides alternative network topologies to configurable medium voltage electrical mesh networks in which a medium voltage is typically in the range of 35 kilovolts (kv) to 1 kv. Ideally, such a simple solution would be easily implemented and run on conventional computing devices. Further, it would be beneficial if the solution provided a suitable response very quickly as even brief disruptions to the electrical power systems in most cities represent a significant loss in productivity and a potential danger to its inhabitants.

SUMMARY OF INVENTION

The invention supports a simple method of configuring mesh networks in a robust way that supports fault location and power restoration.

In accordance with an embodiment of the invention there is taught a method for configuring an electrical power network comprising: providing an electrical network, the electrical network comprising: at least a first electrical power source; a second other electrical power source and, a set of electrical bridges, each of the electrical bridges supporting a conductive state and an other than conductive state; receiving data associated with the electrical network; determining a number of independent virtual paths, C, in dependence upon the received data; determining C different virtual paths; and, when C>1, determining a first location for an electrical bridge in an open state; determining a second location for an electrical bridge in an open state; setting first and second electrical bridges of the set of electrical bridges to an open state in dependence upon the determined first and second locations for an electrical bridge in an open state.

Additionally, the invention describes, a method for configuring an electrical power network comprising: providing an electrical network, the electrical network comprising: at least a first electrical power source; a second other electrical power source and, a set of electrical bridges, each of the electrical bridges supporting a conductive state and an other than conductive state; receiving data associated with the electrical network; mapping of some nodes having a node configuration matching a predetermined node configuration into other predetermined node configurations; determining a number of independent virtual paths, C, in dependence upon the received data and the predetermined node configurations; determining C different virtual paths; and, when C>1, determining a first location for an electrical bridge in an open state; determining a second location for an electrical bridge in an open state; setting first and second electrical bridges of the set of electrical bridges to an open state in dependence upon the determined first and second locations for an electrical bridge in an open state.

BRIEF DESCRIPTION OF THE DRAWINGS

The invention is now described with reference to the drawings in which.

DETAILED DESCRIPTION OF THE INVENTION

It is well known and understood in the art that a short circuit to an electrical ground will act to absorb electrical power. When a consumer is provided electricity from a same source via two different but connected paths a short circuit in either path will prevent the delivery of electricity via either of the two paths. Thus, while it is beneficial to have redundant paths available, it is frequently not beneficial to make use of redundant paths until a conventional path that is experiencing a fault is electrically isolated from the rest of the network.

Figure 1:
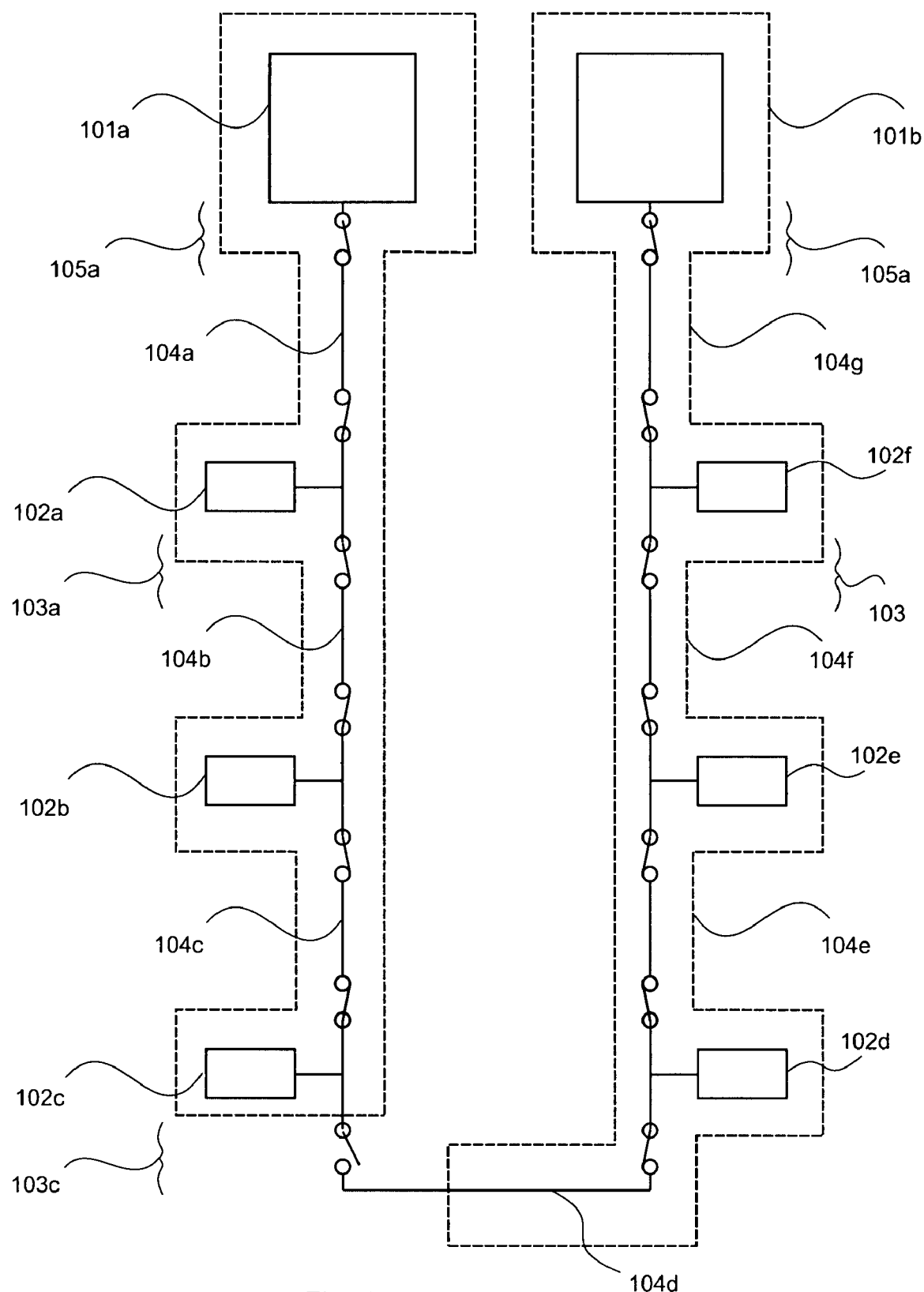
FIG. 1 is a prior art electrical power network.

Referring to FIG. 1, an electrical power network 100 according to the prior art is shown. The network transfers electrical energy from a sources 101a and 101b to consumers 102a to 102f. Each of the consumers 102a to 102f is connected to the electrical power network 100 via a set of breakers 103. The breakers 103 selectively electrically couple the consumers 102a to 102f to power lines 104a to 104g. In addition, breakers 105a and 105b are provided electrically proximate the sources 101a and 101b. Since the breaker 103c is shown in a non-conducting state it is clear that electrical energy propagating along power line 104c will not be permitted to propagate in power line 104d and vice versa. In this way, a ring topology is broken into two electrically isolated paths 106a and 106b. When a fault occurs in electrical path 106a the consumers 102d to 102f associated with electrical path 106b continue to receive electrical power. In addition, once the fault in electrical path 106a has occurred it is relatively easy matter to determine a relative location of the fault by opening the breakers and selectably closing the breakers. Such techniques are well understood in the art. In this instance, this technique benefits from the fact that the electrical energy propagates to any specific location within the network via one and only one path when the network is suitably configured. A person of skill in the art will appreciate that once the fault has been isolated, it is a relatively simple matter to dispatch technical professionals to reset some of the breakers 103 to provide power to all the consumers 102a to 102f while electrically isolating the fault.

Figure 2:
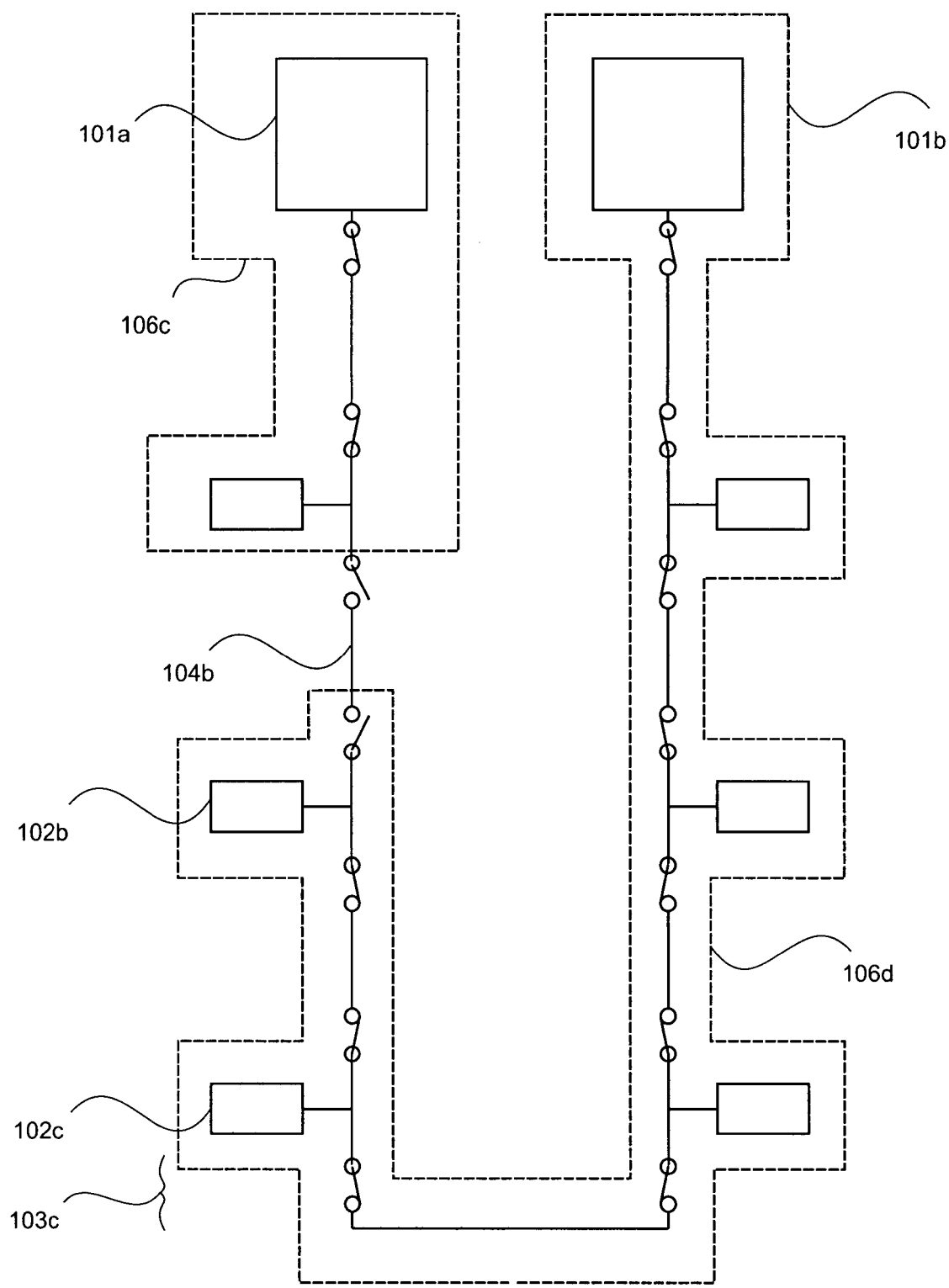
FIG. 2 is the prior art electrical power network of FIG. 1 with an electrically isolated faulty link.

Referring to FIG. 2, the electrical power network 100 of FIG. 1 is shown with power line 104b electrically isolated from the remainder of the electrical power network 100. The breakers 103 electrically adjacent power line 104b are shown in a non-conducting state. In order to ensure that consumers 102b and 102c receive power, the breaker 103c is in the closed position. Thus, consumers 102b and 102c are receiving power from source 101b. This change in state of the breakers 103a and 103c results in two new electrical paths 106c and 106d.

Figure 3:
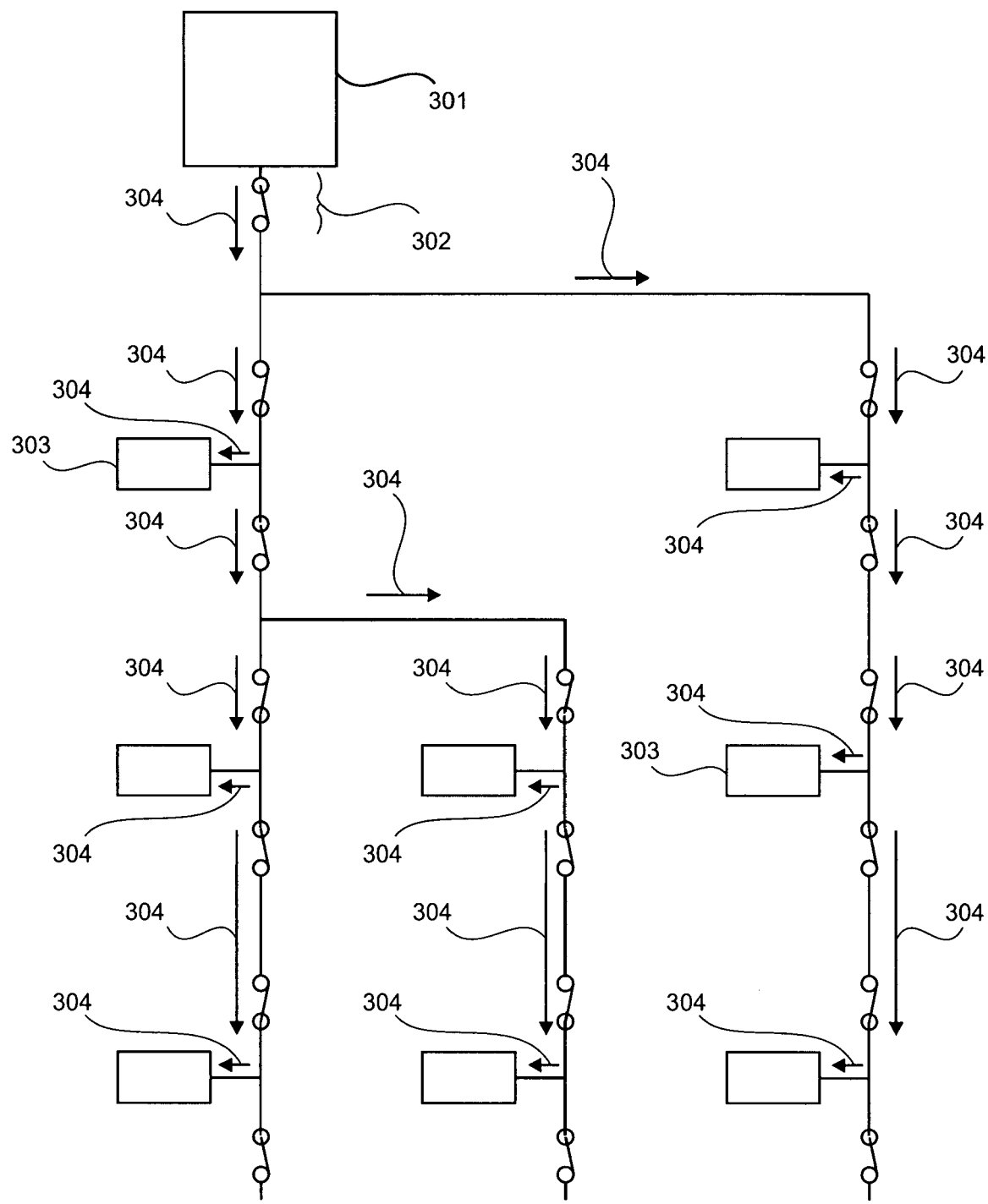
FIG. 3 is a prior art network featuring a multiple branches.

A person of skill in the art will also appreciate that other topologies of electrical grids are sufficiently simple that isolating faults within them is trivial. For example, referring to FIG. 3, a simple electrical network 300 in accordance with the prior art is shown. The network comprises a source 301, breakers 302, and consumers 303. As will be apparent to one of skill in the art, to the extent that electrical power is only able to flow in one direction from a specific source to a specific consumer it is a relatively simple task to determine a relative location of a fault between that source and that consumer despite the presence of multiple branches in the electrical network 300. Thus, a direction of electrical energy propagation is associated with each of the links. Arrows 304 indicate this direction of energy propagation within the network 300.

Modern electrical power networks are typically designed as mesh networks. Like the simple network of FIG. 1, within a mesh network it is desirable to ensure that a given consumer is supplied by only one power source via an electrical path with a clear direction of electrical energy flow absent any redundant electrical paths. Unfortunately, when a fault occurs within a complicated mesh network, it is often very difficult to generate a new set of electrical paths that provides electrical power to all consumers while avoiding the detected fault within the mesh network. Some embodiments of the invention support both easy identification of faulty elements of a complex mesh network and determining suitable paths within complex suitably designed mesh networks. Embodiments of the invention support generating alternative electrical paths that bypass known faulty network elements.

Figure 4:
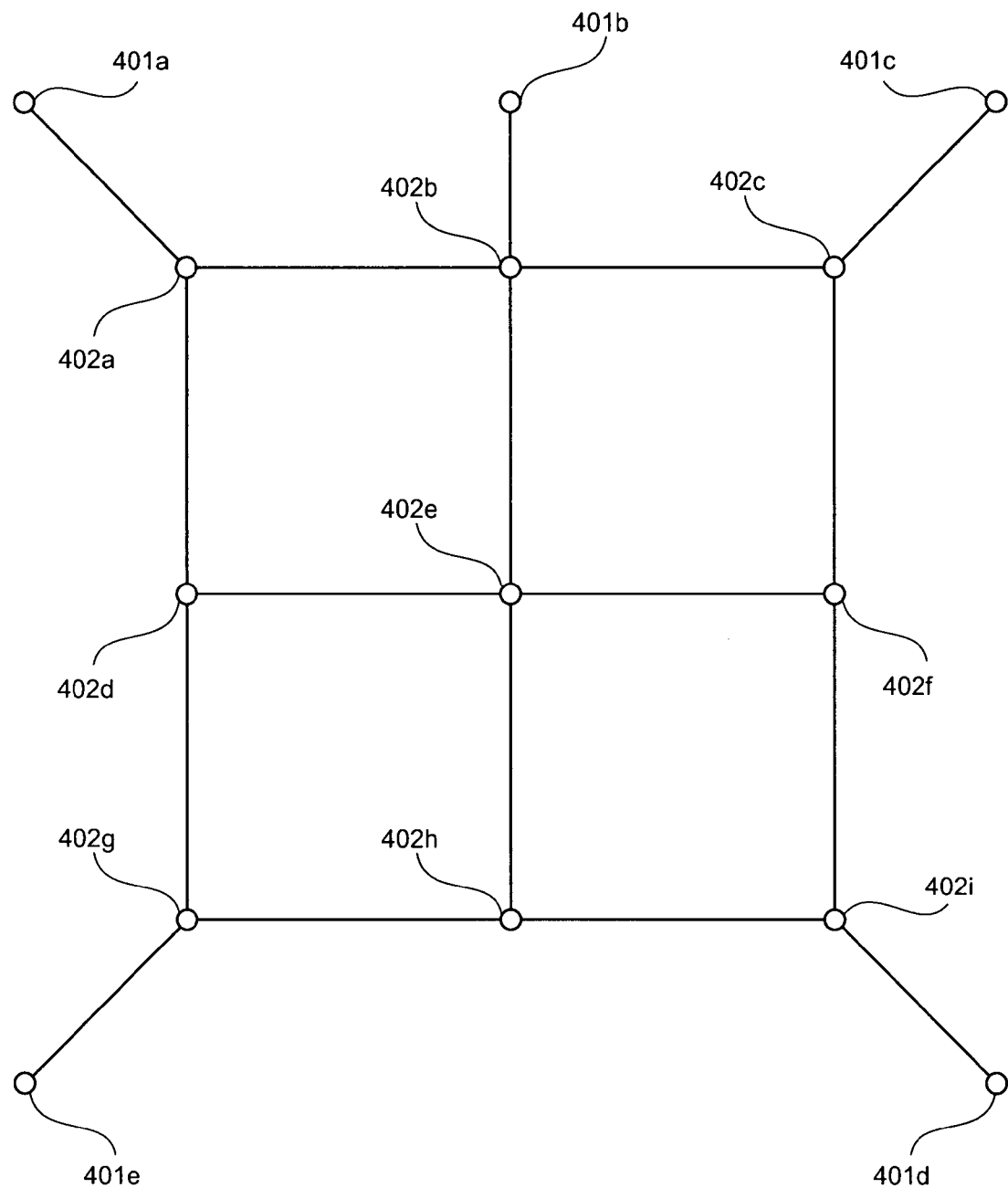
FIG. 4 is a simple mesh network.
Figure 5A:
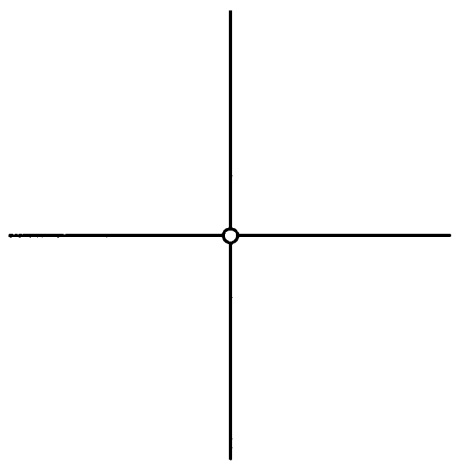
FIG. 5a is a node having more than three electrical contacts.
Figure 5B:
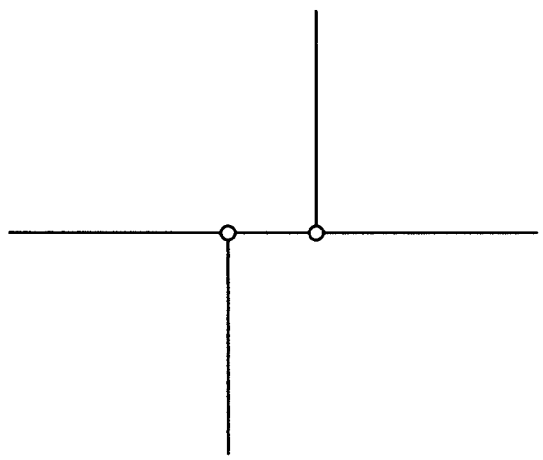
FIG. 5b is a representation of FIG. 4a showing a plurality of nodes each having three electrical contacts.
Figure 5C:
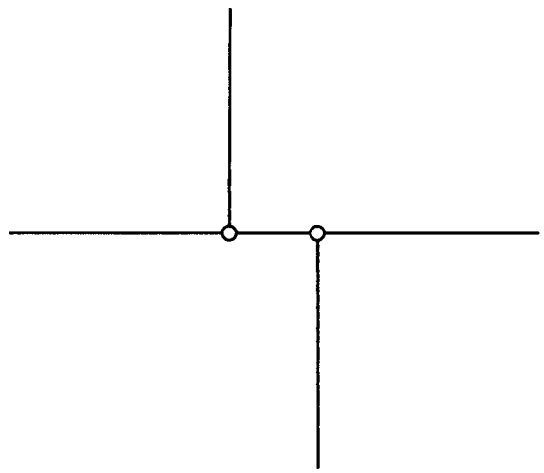
FIG. 5c is an alternative representation of FIG. 4a different from that of FIG. 5b.

Referring to FIG. 4, a simple mesh network suitable for control in accordance with a first embodiment of the invention is shown. The network comprises: sources 401a to 401e that are electrically coupled to the remainder of the network via nodes of degree one and junctions 402a to 402i that are described as nodes of degree three. The mesh network provides electrical energy to loads (not shown) electrically coupled to the nodes. For the purposes of the method nodes of degree two are not addressed initially. In generating the mesh, a person of skill in the art will appreciate that it is often the case that a given location, represented by a node, is often served by more than three links of the mesh. For example in FIG. 4, nodes 402b and 402e each have four links. Such a case is shown in FIG. 5a. In such cases, the node is treated as multiple instances of a plurality of nodes of degree three as shown in FIG. 5b. Clearly, nodes degrees higher than four are also possible however such nodes are easily reduced to multiple nodes of degree three. A person of skill in the art will appreciate that it is often important to accurately represent the configuration of the nodes that are used in producing a node having a degree of four or more. Specifically, in many cases a node of degree four is designed by coupling two nodes of degree three. Thus, the case of FIG. 5a may be more accurately represented by FIG. 5c than FIG. 5b depending on how the connections within the node are disposed.

Figure 6:
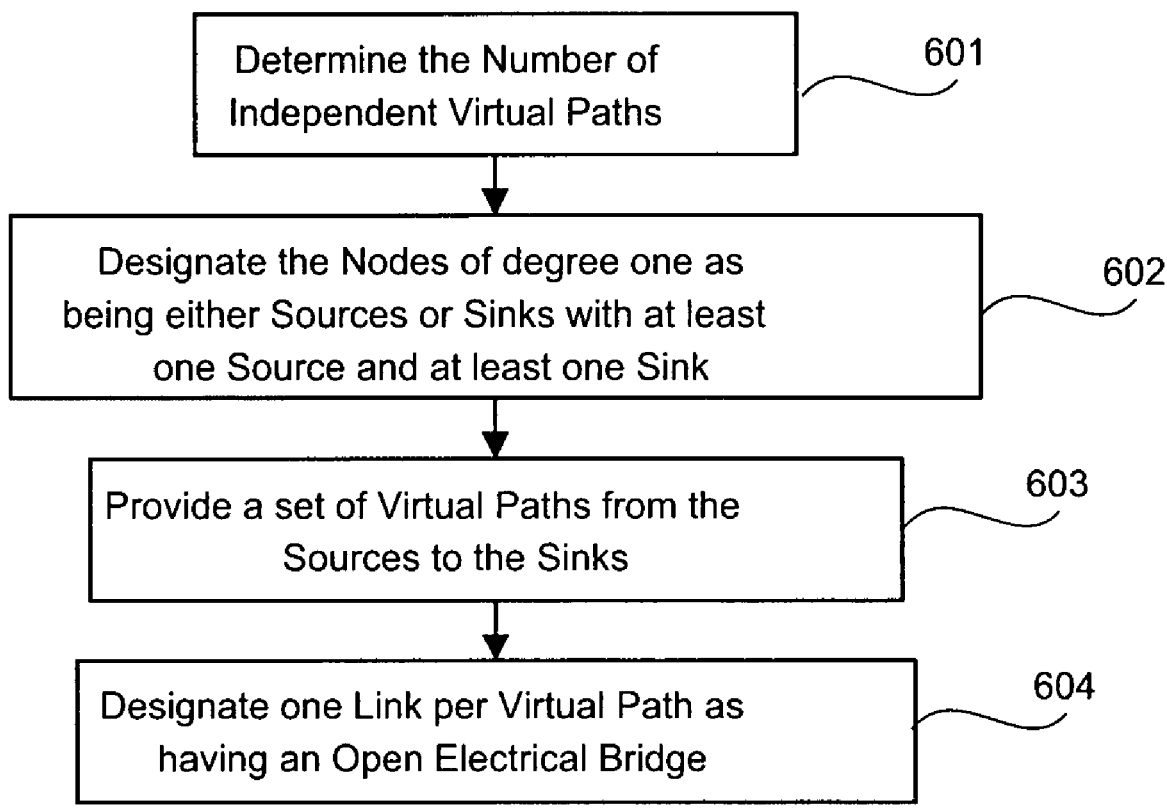
FIG. 6 is a flowchart that outlines the method according to the first embodiment of the invention.

Referring to FIG. 6, a flowchart according to the first embodiment of the invention is provided. The method according to the first embodiment of the invention involves configuring a mesh network to produce a set of independent virtual paths where the individual independent virtual paths are used to determine a set of open bridge locations. The open bridge locations are then used to determine a set of electrical circuits. When the network is configured to support these electrical circuits, the operation of the network is simplified allowing fault location and power restoration schemes analogous to electrical networks described with reference to FIG. 1, FIG. 2 and FIG. 3 whose operation is very simple and well understood in the art. The method relies upon determining a number of independent virtual paths 601. The number of independent paths is given by the formula:

Independent paths: $C=(N+M)/2$ 1. where N is the number of nodes of degree 1, and;
2. M is the number of nodes of degree 3.

Having determined the number of independent paths, the nodes of degree 1 are arbitrarily chosen as being one of a virtual source and a virtual sink 602. In accordance with the method, each power network has at least one virtual source and one virtual sink. Clearly, complex mesh networks are likely to comprise a set of virtual sources and a set of virtual sinks. A set of C virtual paths are defined as flowing from virtual sources of the set of virtual sources to virtual sinks of the set of virtual sinks 603. Each of the C virtual paths is different from the other virtual paths and each of the virtual paths makes use of a segment that is not used by any other virtual paths. Further, the method specifies that all of the segments support at least one of the virtual paths. A single open bridge, such as an open circuit breaker or open electrical switch, is then provided for each of the virtual paths along a segment that is not used by the other virtual paths. A person of skill in the art will appreciate that in some cases the arbitrary selection of the virtual sources and virtual sinks has an effect on the location of the open bridges within the network. Thus, in some cases, should the method not provide a suitable result due to, for example, load balancing constraints, the method is optionally applied again with a different selection of sources and sinks.

Figure 7:
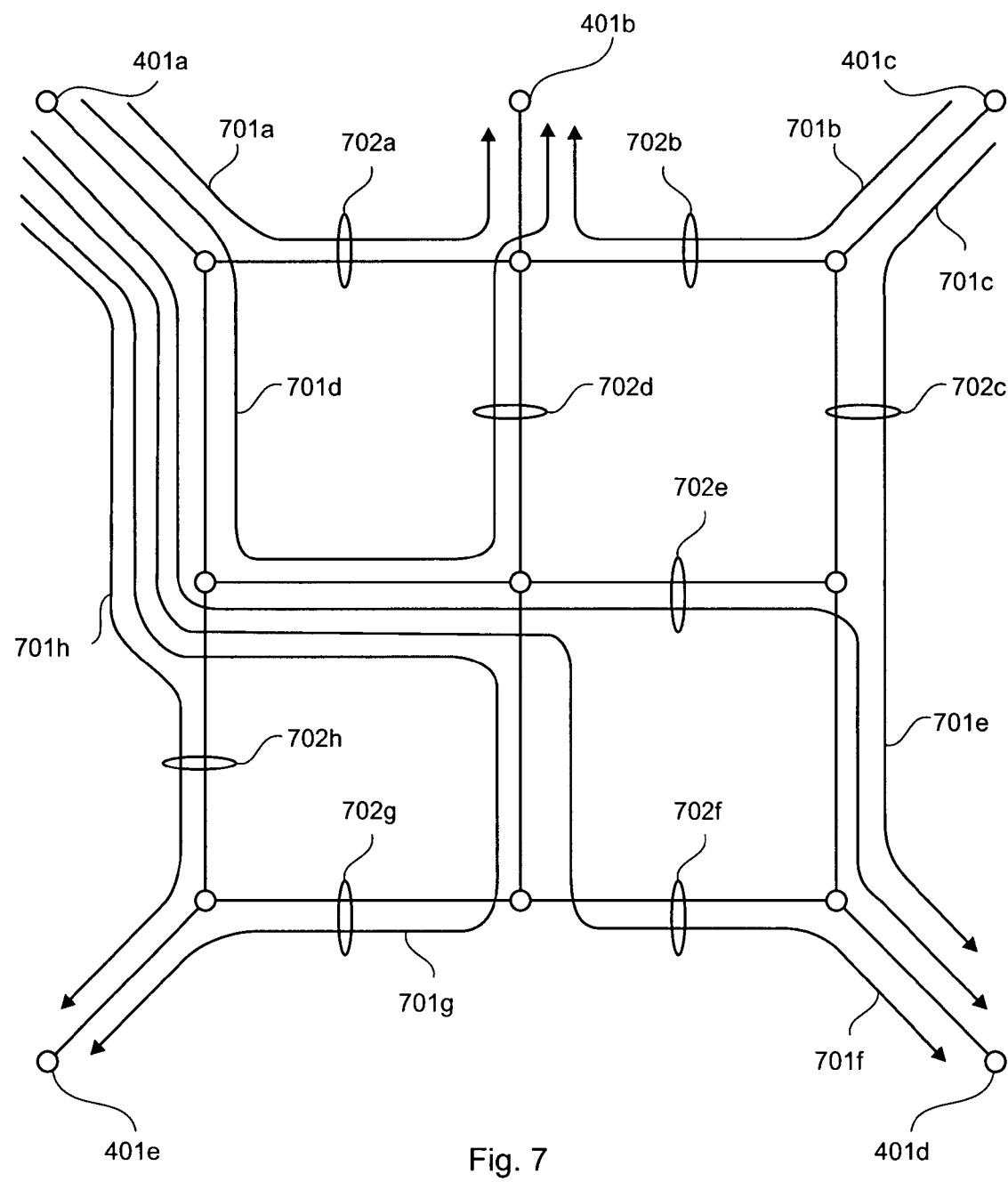
FIG. 7 shows the mesh network of FIG. 4 with virtual paths and resulting open bridge locations provided.

In the case of the network of FIG. 4, nodes 402b and 402e are shown as nodes of degree four but treated as two nodes of degree three. Thus, in the network of FIG. 4, there are five electrical sources, n=5, and there are 11 nodes of degree three, m=3. Thus the number of virtual paths is (5+11)/2 or 8. Referring to FIG. 7, nodes 401a and 401c are designated as virtual sources while nodes 401b, 401d and 401e are virtual sinks. Each of the virtual paths 701a to 701h is shown by an arrow. The virtual paths 701a to 701h begin at a virtual source and end at a virtual sink. Each of the virtual paths 701a to 701h makes use of a segment that is suitable for an open electrical bridge. Suitable locations for the open electrical bridges 702a to 702h are shown as ellipses in FIG. 7.

Figure 8:
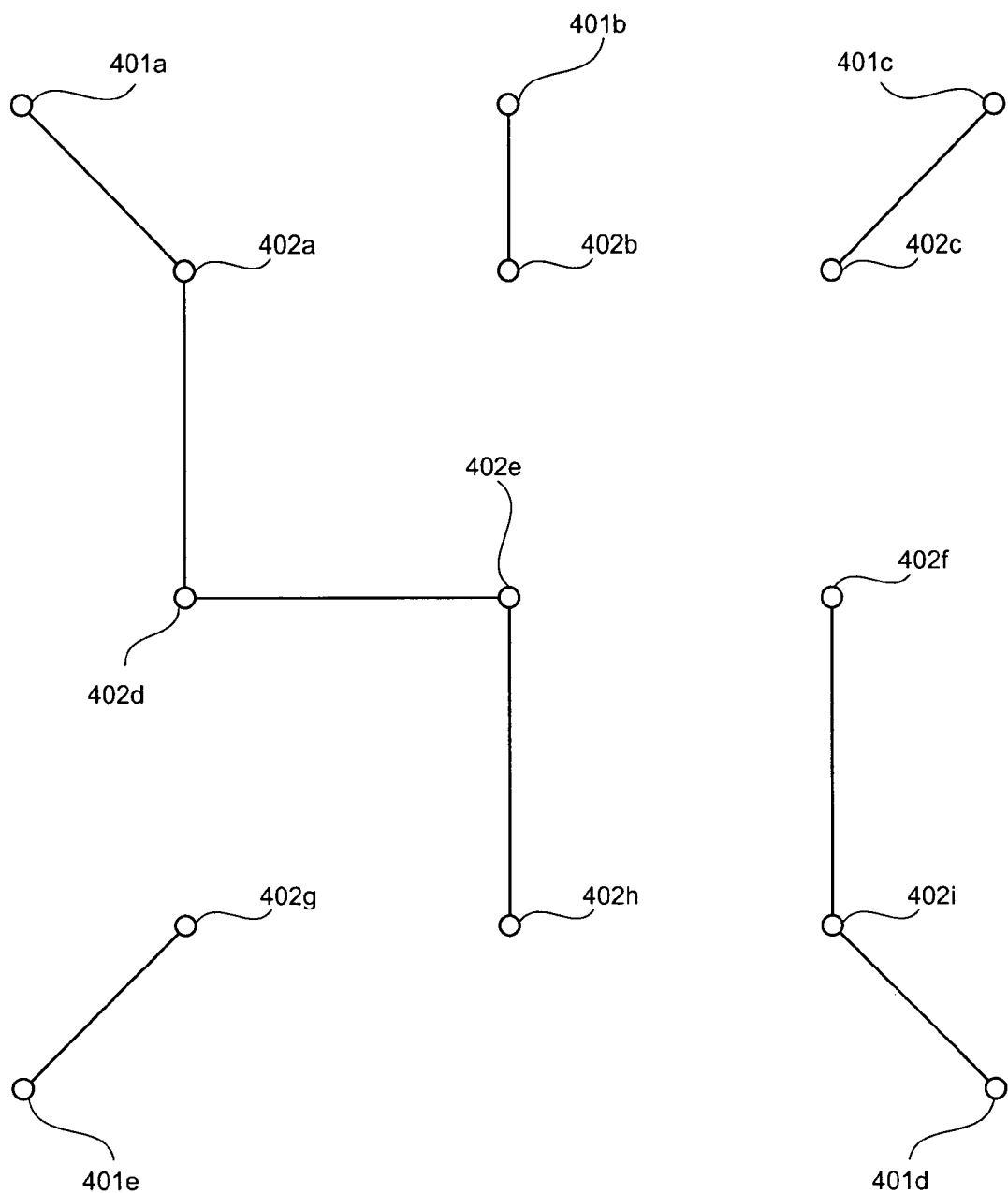
FIG. 8 shows the mesh network of FIG. 4 absent those links designated as having open bridges as described with reference to FIG. 7.

Once the segments that support open bridges are determined, the mesh is optionally drawn as a set of simple, independent electrical power networks. The simple rules described by the first embodiment of the invention serve to generate a set of simple circuits in the mesh network. Referring to FIG. 8, the mesh network of FIG. 4 is drawn with no links shown between those nodes that are designated to have open bridges therebetween. When open bridges are disposed on those links that have been designated to have open bridges it is apparent that each of the nodes 402a to 402i receives electrical power from a single source. As previously described with reference to FIG. 1, locating a fault within a simple circuit is a relatively simple task and therefore, the method according to the first embodiment of the invention supports well known methods and systems for detecting faults. In the event that a portion of the network should fail, the failed portion is easily identified. Once identified, these portions are electrically isolated from the electrical power network by opening the appropriate electrical bridges. A person of skill in art will appreciate that fault location and power restoration methods described with reference to FIG. 1 are applicable to nodes of degree two as well as portions of a network that feature a set nodes of degree two disposed sequentially.

Figure 9:
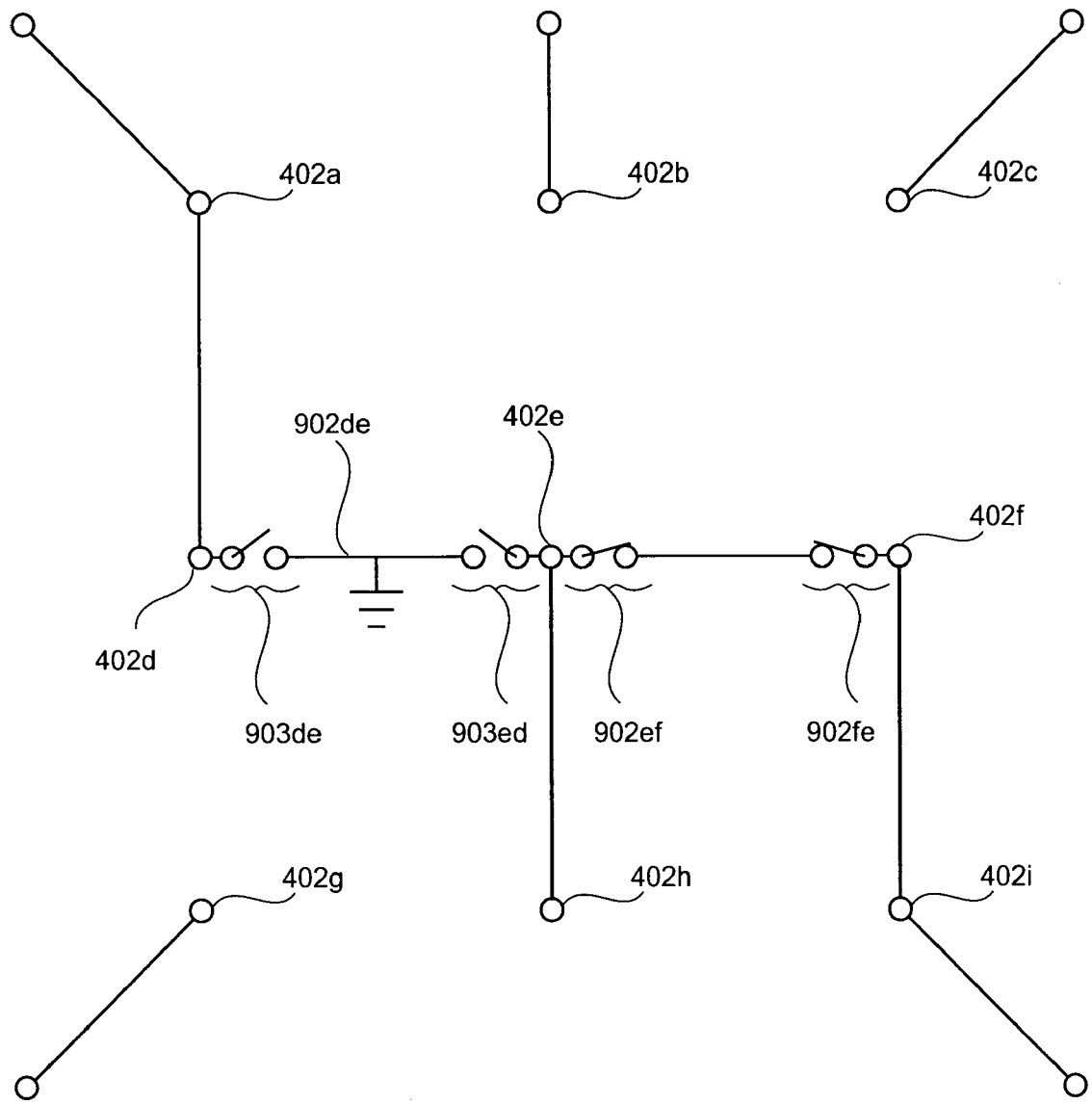
FIG. 9 shows the mesh network of FIG. 4 with an electrical isolated faulty link.

Having isolated the faulty section of the electrical network, there are a variety of ways to proceed in order to restore power to nodes that are currently not receiving electrical energy. In accordance with the first embodiment of the invention, electrical power is returned to the nodes that are not receiving power by simply closing one electrical bridge between the nodes that are not receiving power with an adjacent node that is receiving power with the exception of adjacent nodes that are optionally electrically coupled by links that are known to be faulty. Clearly, in many cases there are other constraints such as load balancing that restrict the choice or which open bridge to close. A person of skill in the art will appreciate that such considerations are easily weighed and considered when choosing a suitable electrical bridge to close. Referring again to FIG. 8, in the event that the link electrically coupling nodes 402d and 402e fails it is a simple matter to locate the faulty link. Referring to FIG. 9, once the faulty link 902de is identified, electrical bridges 903de and 903ed are opened thereby electrically isolating the faulty link 902de from the remainder of the network. Having electrically isolated the faulty link 902de, it is now desirable to restore power to nodes 402e and 402h. Barring further electrical faults, it is apparent that closing any one of the open electrical bridges adjacent the unpowered nodes 402e and 402h other those open electrical bridges electrical isolating the faulty link 902de provide electrical power to nodes 402e and 402h. In this example the bridges 902ef and 902fe are set to a closed state (conducting) in order to restore electrical power to nodes 402e and 402h. A person of skill in the art will appreciate that links connecting the nodes optionally comprises nodes of degree two disposed sequentially between 402d and 402e. When this is the case, a method according to the prior art described with reference to FIG. 1 is optionally carried out to isolate the faulty portion from the remaining portion of the link. In addition each of the nodes optionally corresponds to a consumer, a group of consumers or another electrical load.

In an alternative to the first embodiment of the invention, once the electrical fault is located, it is designated as supporting an open bridge. The virtual paths are then generated in a way that ensures that the electrical fault corresponds to a link with an open bridge. As an open bridge corresponds to a link that is not in use it is then a simple matter to ensure that no power is directed to the faulty portion of the mesh network by electrically isolating the faulty link. It should be noted that in some cases, ie specific mesh network topologies that experience a specific fault, this alternative to the first embodiment of the invention does not always generate a suitable solution.

Figure 10:
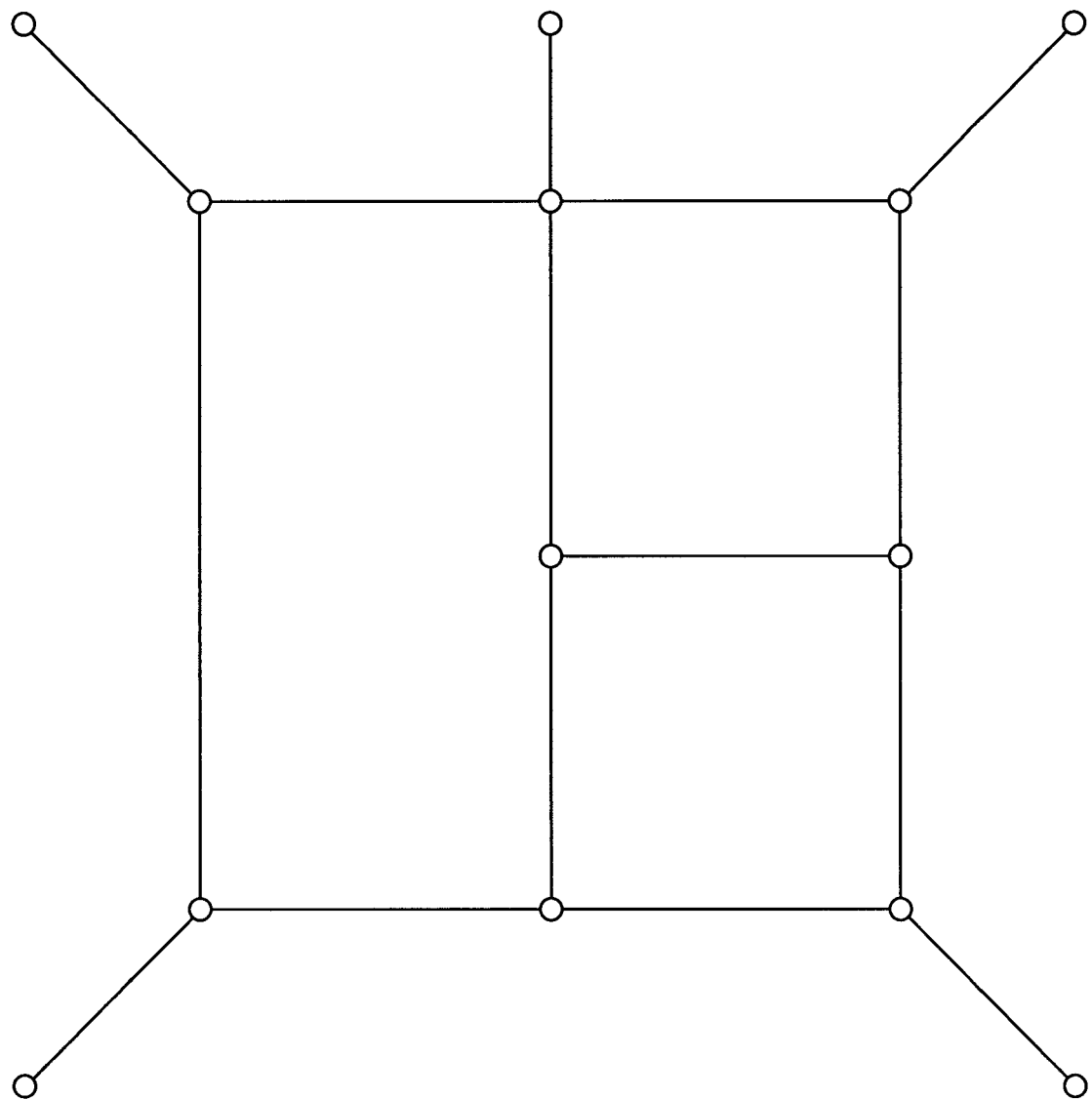
FIG. 10 illustrates the mesh network of FIG. 4 with a faulty segment removed.
Figure 11A:
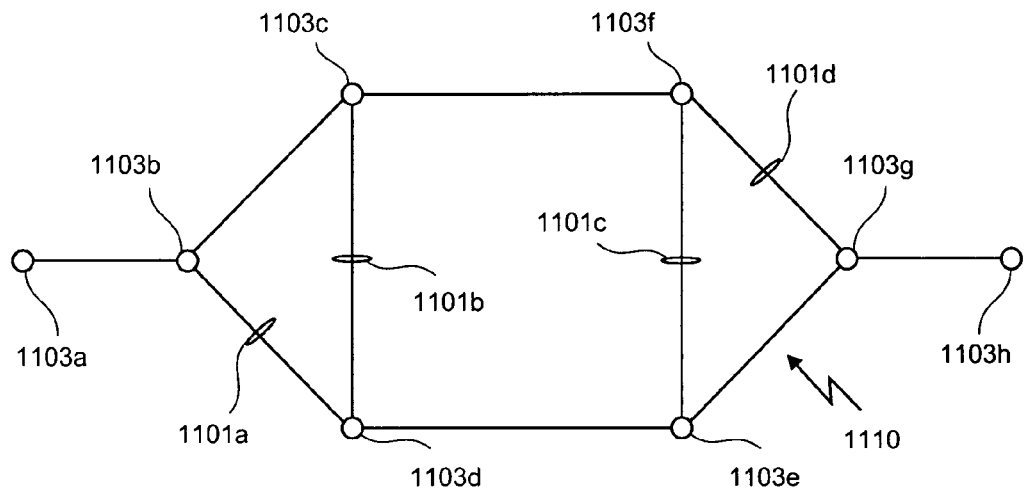
FIG. 11a illustrates a simple mesh network.
Figure 11B:
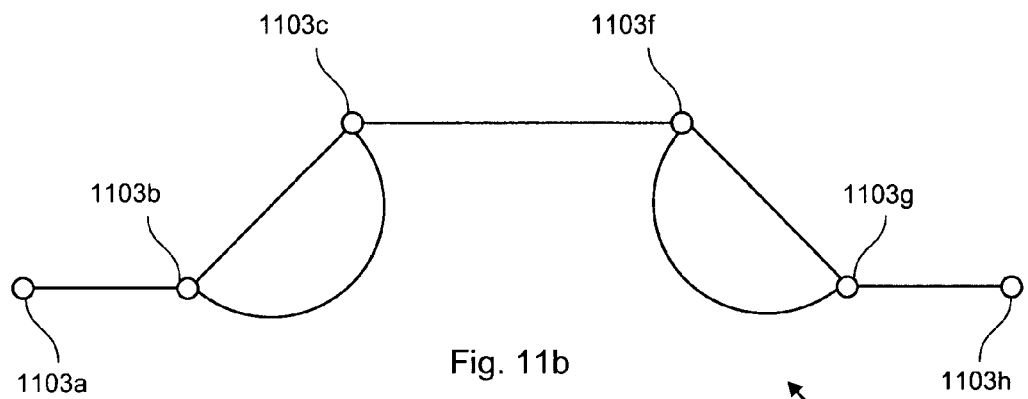
FIG. 11b to 11e illustrate mesh networks based upon the mesh network of FIG. 11a after a failure of a link between two nodes.
Figure 11C:
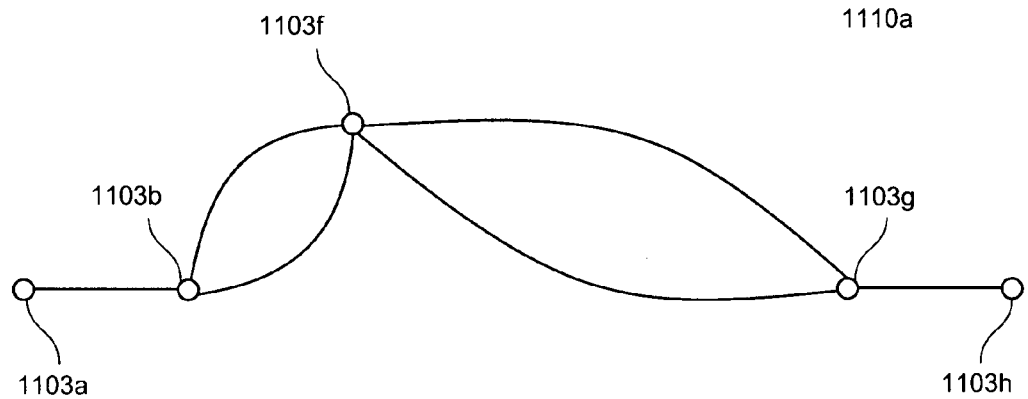
Figure 11D:
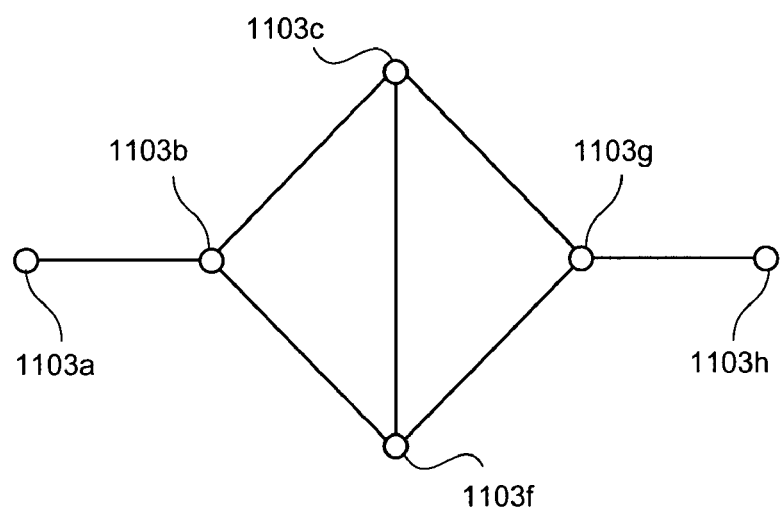

In a second alternative to the first embodiment of the invention, once the electrical fault is located, it is functionally removed from the mesh network. Once the link is "removed" the process in accordance with the first embodiment of the invention is applied again. The removal of the faulty portion of the mesh network is will reduce the value of C. In some cases, ie specific mesh network topologies that experience a specific fault, this alternative to the first embodiment of the invention does not always generate a suitable solution. Referring to FIG. 10, the mesh network FIG. 4 is shown absent the link electrical coupling nodes 402d and 402e. Absent this link, the node 402d is now a node of degree 2 and, as per the method according to the first embodiment of the invention is removed from consideration. Referring to FIG. 1a, a simplified electrical network 1100 is shown. This network 1100 is shown with nodes 1103a to 1103h with open bridges 1101a to 1101d generated in accordance with the method of the first embodiment of the invention. Using the method of the second alternative of the first embodiment of the invention when the link 1102 fails, the network is redrawn absent this link. By removing this link nodes 1103a and 1103b become nodes of degree two and, in accordance with the method of the first embodiment of the invention, these nodes are removed. The resulting network 1110a is shown in FIG. 11b. As drawn in FIG. 11b, the network 1110a will not provide a solution when the method according to the first embodiment of the invention is applied to it. The network is optionally redrawn by combining nodes 1103c and 1103f to form node 1103cf as shown in FIG. 11c. Referring to FIG. 11d, the node 1103cd, being a node of degree four is reduced to two nodes 1103c and 1103f of degree three, thereby producing a new node configuration. This new node configuration is solvable using the first embodiment of the invention however, due to change in the node configuration only some of the solutions generated for the network configuration of FIG. 11d are applicable to the network of FIG. 11a. Clearly, solutions that specify an open bridge on links electrically coupling node 1103b to node 1103f are not suitable as no such electrical coupling is provided in the network of FIG. 11a. Similarly, there is no link electrically coupling 1103c to 1103g.

Figure 11E:
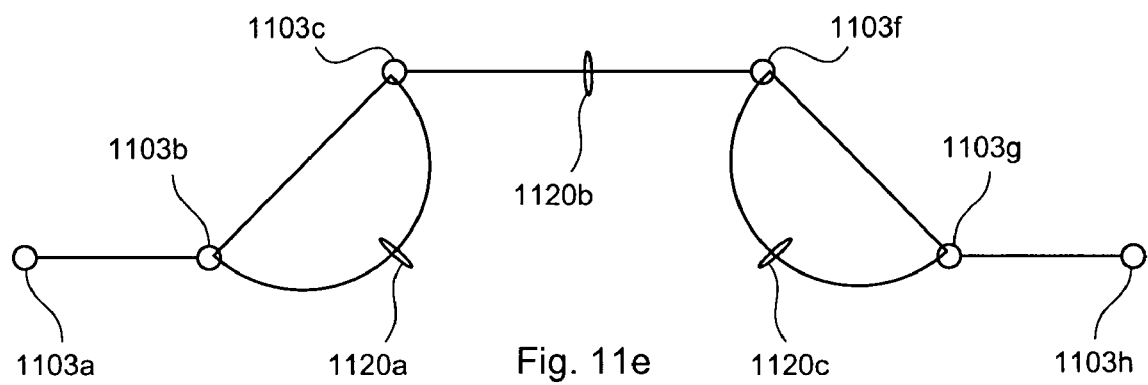

A person of skill in the art will appreciate that there are certain criteria typically applied to generating suitable mesh network designs for electrical networks. In order to avoid difficulties associated certain network topologies, like the one described with reference to FIG. 11b it is suggested that a library of predetermined problem configurations be generated. Referring to FIG. 11e, a suitable solution to the network configuration of FIG. 11b is shown with open bridges 1120a to 1120c. Thus, the node configuration of FIG. 11b is optionally associated with the predetermined open bridge solution of FIG. 11e. Similarly, other predetermined problem configurations are associated with at least one solution and stored. In this way, more complex network designs featuring problem configurations are optionally solved by reducing the problem configuration to a predetermined block with a predetermined solution, applying the method according to the first embodiment of the invention to the remainder of the mesh network, and determining suitable locations for open bridges by combining the solutions.

A person of skill in the art will appreciate that the method of the first embodiment of the invention is optionally carried out by a suitably programmed computer. Further, the mesh network provided with reference to the first embodiment of the invention is intended to support a simple example of the method. A person of skill in the art will appreciate that the method according to the first embodiment of the invention is applicable to a wide range of simple and complicated mesh network topologies. In addition, the method according to the first embodiment of the invention is sufficiently simple that it is optionally executed by a suitable processor disposed within a functioning node of the electrical mesh grid. For example, various companies produce remote terminal units (RTUs) that serve to send and receive information between a master computing system and the nodes of a mesh network. In some cases it is desirable to leave the configuration of a mesh network under the control of a master computing system however this does leave the mesh network vulnerable to a failure of the master computing system. In many cases the RTUs have a processor and memory that is suitable for carrying out a method according to the first embodiment of the invention. Thus, when an electrical grid network comprises RTUs with sufficient processing capability the network is optionally operated in an autonomous fashion using an automated fault detection and power restoration method according to the first embodiment of the invention. In this way, the configuration of the mesh network is determined using components of the mesh network thereby reducing the likelihood that a failure of equipment external to the mesh network will have an adverse effect upon the network itself. Clearly, different RTUs have different processing capabilities. Although the method according to first embodiment of the invention is believed to be easily supported by a variety of such processors the method has been tested using Motorola™ Moscad™ RTUs.

Embodiments of the invention presented herein are intended to support medium voltage networks, including medium voltage mesh networks. These networks support the transfer of electrical energy using voltage signals at 1 kvolt to 35 kvolts. A person of skill in the art will appreciate that various embodiments of the invention have applications in other fields. For example, the delivery of electrical power in a navel vessel is often critical. Even momentary disruptions of electrical power may leave a navel vessel vulnerable to enemy fire. The method according to the first embodiment of the invention is easily adapted by one of skill in the art to support power distribution within a naval vessel.

A person of skill in the art will also appreciate that the methods according to the invention are also useful in situations in which a node fails. Specifically, if a node of degree three should fail then it is recommended to isolate the node from the remainder of the mesh network by inhibiting a flow of electrical energy via any of the three electrical links associated with the failed node. Thus, each of the links is set to inhibit electrical signals thereby electrically isolating the failed node. A person of skill in the art will appreciate that a node of a degree that is higher than degree three is often made up of a plurality of nodes of degree three with a predetermined electrical configuration. Clearly, when a node of a degree higher than degree three fails it is often desirable to understand the actual configuration of the electrical interconnection within the node. In some cases, it is possible to continue operating a portion of the node while in others it is not. Regardless of the degree of the failed node it is desirable to electrically isolate the failed portion of the node from the remainder of the electrical network. Clearly, if a node of degree one should fail corresponding to a failure of an electrical power source then the failed node is electrically isolated from the remainder of the network. Thus, the failure of a node of degree one is very analogous to a failure of a link electrically coupled to the node of degree one.

Numerous other embodiments of the invention will be apparent to one of skill in the art without departing from the spirit and scope of the invention.

What is claimed is:

1. A method for configuring an electrical power distribution network, the method comprising:
   accessing data associated with the electrical power distribution network;
   identifying from the data:
      a plurality of electrical power sources of the electrical power distribution network;
      a plurality of electrical links of the electrical power distribution network connecting each electrical power source of the plurality of electrical power sources through the electrical power distribution network to every other electrical power source of the plurality of electrical power sources, each of the electrical links supporting a conductive state and an other than a conductive state;
   determining a number, C, of different virtual paths to be generated in dependence upon the data, C>1;
   generating and separately storing C different virtual paths, each virtual path identifying a unique subset of electrical links of the plurality of electrical links, wherein the electrical links of each unique subset of electrical links connect one electrical power source of the plurality of electrical power sources to another electrical power source of the plurality of electrical power sources, wherein the unique subset of electrical links identified by each virtual path includes at least one exclusive electrical link which is included in only that unique subset of electrical links, and wherein each electrical link of the plurality of electrical links is included in at least one unique subset of electrical links; and
   setting in the electrical power distribution network, each of the at least one exclusive electrical links included in each unique subset of electrical links, to the other than the conductive state.

2. A method according to claim 1 further comprising:
   detecting a fault within the electrical power distribution network; and
   changing the state of at least one electrical link to the other than the conductive state, the changing of the state of the at least one electrical link for isolating the fault from a remainder of the electrical power distribution network.

3. A method according to claim 2 further comprising:
   automatically determining that a portion of the electrical power distribution network is no longer receiving electrical energy due to the changing of the state of the at least one electrical link to the other than the conductive state;
   determining a suitable electrical link that is currently in the other than the conductive state; and
   changing the state of the suitable electrical link to the conductive state, thereby restoring a flow of electrical energy to the portion of the electrical power distribution network.

4. A method according to claim 3 further comprising determining from the data a plurality of nodes of degree three of the electrical power distribution network, the plurality of nodes forming junctions between electrical links that are connected; wherein the plurality of electrical power sources consists of N electrical power sources, and wherein the plurality of nodes consists of M nodes of degree three, and wherein determining the number C, of different virtual paths to be generated comprises determining the number N, of electrical power sources and the number M, of nodes of degree three; and wherein in the step of generating and separately storing C different virtual paths, each virtual path further identifies a respective set of nodes forming junctions between the electrical links of the unique subset of electrical links identified by the virtual path.

5. A method according to claim 4 wherein after each of the at least one exclusive electrical links included in each unique subset of electrical links has been set to the other than the conductive state, each node of the nodes of degree three is connected by the plurality of electrical links to one and only one electrical power source.

6. A method according to claim 5 wherein the number of independent virtual paths, C, is determined by the formula C=(N+M)/2.

7. A method according to claim 6 wherein a location of a first node of the nodes of degree three comprises a processor, the processor for:
receiving the data;
performing the determining of the number, C, of independent virtual paths, in dependence upon the data; and
performing the generating and storing of the C different virtual paths.

8. A method according to claim 7 wherein the location of the first node comprises a remote terminal unit and the remote terminal unit comprises the processor.

9. A method according to claim 8 wherein the electrical power distribution network is a mesh network.

10. A method for configuring an electrical power distribution network, the method comprising:
generating a predetermined link solution for a predetermined electrical network problem configuration comprising:
providing a predetermined electrical network problem configuration comprising:
a plurality of source nodes representing a plurality of electrical power network sources; and
a plurality of segments representing a plurality of electrical power network links, the plurality of segments connecting each source node of the plurality of source nodes to every other source node of the plurality of source nodes, each electrical power network link of the plurality of electrical power network links supporting a conductive state and an other than a conductive state,
determining a number, C, of independent virtual paths in dependence upon the predetermined electrical network problem configuration, C>1;
generating and separately storing C different virtual paths, wherein each of the virtual paths identifies a unique subset of segments of the plurality of segments, wherein the segments of each unique subset of segments connect one source node to another source node, wherein the unique subset of segments identified by each virtual path includes at least one segment which is included only in that unique subset of segments, and wherein each segment of the plurality of segments is included in at least one unique subset of segments;
identifying the at least one segment of each virtual path as representing an electrical power network link that should be in the other than the conductive state, thereby generating the predetermined link solution; and
associating the predetermined link solution with the predetermined electrical network problem configuration,
identifying a subportion of the electrical power distribution network as corresponding to the predetermined electrical network problem configuration;
retrieving the predetermined link solution associated with the predetermined electrical network problem configuration; and
applying the link solution to the subportion of the electrical power distribution network by changing a state of each electrical link of the subportion of the electrical power distribution network which corresponds to an electrical power network link represented by a segment identified as representing an electrical power network link that should be in the other than the conductive state, to the other than the conductive state.

11. A method according to claim 10 comprising:
detecting a fault within the electrical power distribution network; and
changing the state of at least one electrical link to the other than conductive state, the changing of the stake of the at least one electrical link for isolating the fault from a remainder of the electrical power distribution network.

12. A method according to claim 11 comprising:
determining that a portion of the electrical power distribution network is no longer receiving electrical energy due to the changing of the state of the at least one electrical link; and
determining a suitable electrical link that is currently in the other than the conductive state; and
changing the state of the suitable electrical link to the conductive state, thereby restoring a flow of electrical energy to the portion of the electrical power distribution network.

13. A method according to claim 12 wherein determining the suitable electrical link comprises:
determining that the suitable electrical link is electrically disposed between nodes of the subportion of the electrical power distribution network corresponding to the predetermined electrical network problem configuration; and,
following instructions associated with a predetermined fault procedure associated with the predetermined link solution associated with the predetermined electrical network problem configuration.

14. A method according to claim 13 wherein the electrical power distribution network is a mesh network.

15. A method for providing an electrical power distribution network, the method comprising:
accessing data associated with a proposed electrical power distribution network;
identifying from the data:
a plurality of proposed electrical power sources of the proposed electrical power distribution network;
a plurality of proposed electrical links of the proposed electrical power distribution network connecting each proposed electrical power source of the plurality of proposed electrical power sources through the proposed electrical power distribution network to every other proposed electrical power source of the plurality of proposed electrical power sources,
determining a number, C, of different virtual paths to be generated in dependence upon the data, C>1;
generating and separately storing C different virtual paths, each virtual path identifying a unique subset of proposed electrical links of the plurality of proposed electrical links, wherein the proposed electrical links of each unique subset of proposed electrical links connect one proposed electrical power source of the plurality of proposed electrical power sources to another proposed electrical power source of the plurality of proposed electrical power sources, wherein the unique subset of proposed electrical links identified by each virtual path includes at least one exclusive proposed electrical link which is included in only that unique subset of proposed electrical links, and wherein each proposed electrical link of the plurality of proposed electrical links is included in at least one unique subset of proposed electrical links;

providing an electrical power distribution network having for each proposed electrical power source a respective electrical power source, for each proposed electrical link a respective electrical link, wherein each electrical link supports a conductive state and an other than a conductive state, and wherein the electrical power sources and the electrical links of the electrical power distribution network are connected to each other in a manner corresponding to the connections between the proposed electrical power sources and the proposed electrical links of the proposed electrical power distribution network; and setting in the electrical power distribution network, each of the electrical links that correspond to the at least one exclusive proposed electrical link included in each unique subset of proposed electrical links, to the other than the conductive state.

16. A method according to claim 15 further comprising determining from the data a plurality of proposed nodes of degree three of the proposed electrical power distribution network, each proposed node of the plurality of proposed nodes forming junctions between proposed electrical links that are connected; wherein the plurality of proposed electrical power sources consists of N proposed electrical power sources, and wherein the plurality of proposed nodes consists of M proposed nodes of degree three, wherein determining the number C, of different virtual paths to be generated comprises determining the number N, of proposed electrical power sources and the number M, of proposed nodes of degree three; wherein in the step of generating and separately storing C different virtual paths, each virtual path further identifies a respective set of proposed nodes forming junctions between the proposed electrical links of the unique subset of proposed electrical links identified by the virtual path, and wherein providing the electrical power distribution network comprises providing for each proposed node a respective node of the power distribution network; wherein the nodes form junctions between the electrical links in a manner corresponding to the junctions formed between proposed electrical links by the proposed nodes.

17. A method according to claim 16 wherein after each of the electrical links which correspond to the at least one exclusive proposed electrical link included in each unique subset of proposed electrical links has been set to the other than the conductive state, each node of the power distribution network is connected by the electrical links to one and only one electrical power source.

18. A method according to claim 17 wherein the number of independent virtual paths, C, is determined by the formula $C=(N+M)/2$.

19. A method according to claim 18 wherein a location of a first node of the nodes corresponding to the proposed nodes of degree three comprises a processor, the processor for:
receiving the data;
performing the determining of the number, C, of independent virtual paths, in dependence upon the data; and
performing the generating and storing of the C different virtual paths.

20. A method according to claim 19 wherein the location of the first node comprises a remote terminal unit and the remote terminal unit comprises the processor.

21. A method according to claim 20 wherein the electrical power distribution network is a mesh network.

* * * * *